3,166,379
PURIFICATION OF HYDROFLUORIC ACID
Howard B. Bradley and Robert G. Pankhurst, Tonawanda, N.Y., assignors to Union Carbide Corporation, a corporation of New York
No Drawing. Filed June 4, 1962, Ser. No. 199,642
9 Claims. (Cl. 23—153)

This invention relates to a process for the removal of impurities, especially arsenic and phosphorus impurities, from hydrofluoric acid and to the so-purified product.

Hydrofluoric acid has many industrial applications where a high degree of purity is necessary. It is employed, for example, in the electronic metals industry in several ways. First, it is employed in analytical procedures for the analysis of trace amounts of arsenic and phosphorus in "semi-conductor grade" silicon metal and in the silicon-containing compounds, such as trichlorosilane, silicon tetrachloride and monosilane, employed as raw materials for such "semi-conductor grade" silicon metal. Second, it is employed as a cleaning agent and etching agent on the finished silicon electronic devices. Some inorganic impurities, such as borates, are soluble in hydrofluoric acid and are therefore easily removed in a cleaning or etching process. This cleaning with hydrofluoric acid is especially useful in the production of high purity epitaxial silicon. This form of silicon metal is prepared by thermally or chemically decomposing a silicon compound vapor, often containing "doping agents" such as aluminum compounds, on a silicon metal base. The resulting deposited film has the same crystal structure as the silicon base. This film is difficult to purify by conventional refining techniques and must be cleaned and purified by means of a hydrofluoric acid-containing wash bath. Typical metal cleaning baths contain mixtures of hydrofluoric acid, nitric acid and glacial acetic acid.

In the analysis of arsenic and phosphorus content in materials, such as high purity silicon or high purity silicon-containing compounds, one often deals with arsenic and phosphorus levels of less than about 100 p.p.b. by weight. The abbreviation "p.p.b." used herein refers to parts by billion by weight or parts per $10^9$ parts by weight. It is thus apparent that the reagents used in the analytical process should be substantially free of arsenic and phosphorus in order to prevent contaminating the sample and causing an erroneous analysis result.

Silicon metal useful in semi-conductors, such as transistors, must be extremely pure. Arsenic and phosphorus impurities, even in trace amounts, can have gross effects upon the electronic properties of silicon. The hydrofluoric acid used as a wash cleaning agent and etching agent for silicon devices should be as free as possible of arsenic and phosphorus in order to prevent contaminating the silicon being "cleaned."

Hydrofluoric acid can be purified by the process of the present invention which comprises contacting the impure hydrofluoric acid with an oxidizing agent reactive toward arsenic and phosphorus impurities which oxidizes the arsenic and phosphorus impurities to high-boiling point oxidized impurity compounds, separating such high-boiling point oxidized impurity compounds from the hydrofluoric acid, contacting the partially purified hydrofluoric acid with a halogen selected from the class consisting of iodine, bromine, and chlorine to form high-boiling point halogen-impurity compounds, and then separating the high-boiling point halogen-impurity compounds from the hydrofluoric acid. The resulting purified hydrofluoric acid is especially useful in the electronic metals industry and in other applications where a high degree of purity is necessary. Such hydrofluoric acid has a purity unequalled in the prior art.

The oxidizing step removes substantially all of the arsenic and some of the phosphorus while the halogen step removes the remainder of the phosphorus and any remaining arsenic.

Alternatively, the hydrofluoric acid can be first contacted with a halogen selected from the class consisting of iodine, bromine and chlorine to form high-boiling point halogen-impurity compounds, separating such high-boiling point halogen-impurity compounds from the hydrofluoric acid, contacting the partially purified hydrofluoric acid with an oxidizing agent which oxidizes arsenic and phosphorus impurities to high-boiling point oxidized impurity compounds, and then separating such high-boiling point oxidized impurity compounds from the hydrofluoric acid.

Still a third method is to add the oxidizing agent and the halogen selected from the class consisting of iodine, bromine and chlorine together to the hydrofluoric acid and then separate the high-boiling point oxidized impurity compounds and halogen-impurity compounds together from the hydrofluoric acid.

The high-boiling point oxidized impurity compounds and halogen-impurity compounds can be conveniently and preferably separated from the hydrofluoric acid by distillation. It should be understood that other separation methods, such as selective adsorption of the oxidized impurity compounds and the halogen-impurity compounds and differential diffusion through a membrane or porous medium, can also be employed within the scope of the invention.

The oxidizing agent used in this process is preferably an alkali metal permanganate, such as potassium permanganate or sodium permanganate or an alkaline earth metal permanganate, such as calcium permanganate, magnesium permanganate, strontium permanganate or barium permanganate. Ammonium permanganate can also be employed. Other oxidizing agents which can be employed are illustrated, for example, by the persulfates, such as ammonium persulfate, potassium persulfate and sodium persulfate, and the chlorates, such as ammonium chlorate, potassium chlorate and sodium chlorate. Manganese dioxide can also be employed. Potassium permanganate is generally the preferred oxidizing agent for this process. The choice of a specific oxidizing agent or mixture of oxidizing agents will be determined by the particular impurities to be removed and the material systems in which the impurities are present. For example, removal of arsenic impurities from one material may preferably require an oxidizing agent different from that required for removing arsenic impurities from a different material or for removing phosphorus impurities from the same or different materials. Choice of the oxidizing agent is thus dictated by purity considerations in terms of the end product.

The oxidizing agent reactive toward arsenic and phosphorus impurities is contacted with the hydrofluoric acid under conditions resulting in the formation of high boiling point oxidized arsenic and phosphorus compounds. These high-boiling point oxidized impurity compounds having boiling points higher than those of the original impurities and higher than hydrofluoric acid are then separable, preferably by distillation, from the hydrofluoric acid.

In carrying out the process of this invention, the hydrofluoric acid is contacted with a halogen of the group consisting of iodine, bromine and chlorine under conditions resulting in the formation of high boiling point compounds with the phosphorus and arsenic impurities. These high boiling point halogen-impurity compounds having boiling points higher than those of the original impurities and higher than hydrofluoric acid are then separable, preferably by distillation, from the hydrofluoric acid. Fluorine is not considered to be useful in this process since it is extremely reactive and would involve great care to prevent reaction between fluorine and materials other than the impurities in the hydrofluoric acid.

Among the useful halogens, iodine is the preferred halogen to be used to form the high boiling point halogen-impurity compounds. Iodine forms compounds with the impurities, such as phosphorus and arsenic, having higher boiling points than do the corresponding bromine-impurity and chlorine-impurity compounds. The iodine-impurity compounds are thus easier to separate by distillation from the hydrofluoric acid. As compared to removal of iodine-impurity compounds, a distillation step having an increased number of theoretical distillation plates is usually required to separate the bromine-impurity and chlorine-impurity compounds from the hydrofluoric acid. Any excess iodine which is carried over into the purified hydrofluoric acid is easily removed by absorption in the walls of the polyethylene or polypropylene containers generally used for hydrofluoric acid service. Care must be taken to remove any excess bromine or chlorine from the purified hydrofluoric acid. Such excess can be removed by fractional distillation or by selective adsorption of the bromine or chlorine, for example.

While it is preferred that the iodine, bromine or chlorine be used in elemental form, it is also within the scope of the present invention to employ halogen compounds which can release nascent iodine, bromine or chlorine for reaction with the arsenic and phosphorus impurities in hydrofluoric acid. Potassium iodide is an example of such compound. An oxidizing agent will release free iodine from this compound.

The process conditions for carrying out this invention are not narrowly critical. Reaction temperature above room temperature is desirable in order to obtain reasonable reaction rates. Preferably the hydrofluoric acid is contacted with the oxidizing agent and the iodine, bromine or chlorine at the boiling point of hydrofluoric acid so that it can be continuously removed by distillation from the oxidized impurity compounds and the halogen-impurity compounds which remain in the residue. Atmospheric pressure conditions are also preferably employed. Hydrofluoric acid can thus be purified under reflux conditions of atmospheric pressure and about 120° C. The amounts of oxidizing agent and halogen are also not critical, but it is preferred that they both be present in amounts in excess of that required to completely react with the impurities to be removed.

It is noted that while this process is specifically useful to remove arsenic and phosphorus impurities, substantial quantities of sulfur impurities are also removed. To aid in sulfur removal, a small amount of barium compound, such as barium oxide, is preferably added along with the oxidizing agent. This will form an insoluble, high-boiling barium sulfate precipitate which can be easily separated from the hydrofluoric acid.

The invention will be illustrated by the following example.

*Example*

The purification equipment consists of a polytetrafluoroethylene distillation flask and distillation column (having about 1–2 theoretical plates) and a polyethylene receiver. Place 2 liters of C.P. (chemically pure) hydrofluoric acid (containing about 51 p.p.b. by weight phosphorus and about 15 p.p.b. by weight arsenic) in the distilling flask. Add 5 ml. of 2.5 weight percent aqueous solution of potassium permanganate and heat to boiling at atmospheric pressure for about one minute. Heating of the distillation flask contents was accomplished by means of induction heating using a graphite susceptor immersed in the hydrofluoric acid. Then connect the distillation column and continue heating to boiling point at atmospheric pressure until about 25 ml. hydrofluoric acid distillate has been collected in the polyethylene receiver. Discard this distillate since it contains impurities picked up from the container walls. Allow the system to cool for one hour. Now heat to boiling at atmospheric pressure again and when 100 ml. hydrofluoric acid distillate has been collected, use it to rinse the receiver and then discard this rinse liquid. Resume distillation and maintain product recovery at a very slow rate. Retain the next 1500 ml. of purified distillate. Discard the distillation flask residue since it contains the oxidized impurity compounds.

Place the 1500 ml. of purified distillate in a clean polytetrafluoroethylene distilling flask equipped with polytetrafluoroethylene distillation column and polyethylene receiver. Add about 1 gram of crystalline iodine. Heat the system to boiling at atmospheric pressure and when 100 ml. distillate has been collected, use it to rinse the receiver and then discard the rinse liquid. Resume distillation and maintain product recovery at a very slow rate. Retain the next 1200 ml. of purified hydrofluoric acid distillate. Discard the distillation flask residue since it contains the iodine-impurity compounds. This purified hydrofluoric acid product contains no detectable amounts of arsenic and phosphorus (less than 0.5 p.p.b. by weight by colorimetric techniques). Such product has utility in analytical procedures wherein trace amounts of arsenic and phosphorus would lead to erroneous results or in cleaning operations where minor amounts of arsenic and phosphorus would contaminate the operation, or in other applications requiring a high purity hydrofluoric acid.

If the primary impurity in hydrofluoric acid which is desired to be removed is arsenic, only the steps of contacting the acid with the oxidizing agent and then separating the high-boiling point oxidized impurity compound from the hydrofluoric acid need be carried out. This purified product also has utility as an analytical reagent and cleaning acid.

Likewise, if phosphorus is the primary impurity in hydrofluoric acid which is desired to be removed, only the steps of contacting the acid with the halogen selected from the group consisting of iodine, bromine and chlorine and then separating the high-boiling point halogen-impurity compound from the hydrofluoric acid need be carried out. This purified product also has utility as an analytical reagent and cleaning acid.

The phosphorus and arsenic impurities are described herein in terms of parts by weight phosphorus or arsenic, for example. These terms refer to equivalent weight of elemental metal. The impurities are generally not present in elemental form but are present in some combined form such as arsenic and phosphorus compounds.

What is claimed is:

1. A process for removing arsenic, phosphorus and sulfur impurities from hydrofuoric acid which comprises contacting the hydrofluoric acid with an oxidizing agent which oxidizes such impurities to high-boiling point oxidized impurity compounds together with a halogen selected from the class consisting of iodine, bromine and chlorine to form high-boiling point halogen-impurity compounds, and separating the high-boiling point oxidized impurity compounds together with the high-boiling point halogen-impurity compounds from the hydrofluoric acid.

2. A process for removing arsenic, phosphorus and sulfur impurities from hydrofluoric acid which comprises in sequence contacting the hydrofluoric acid with an oxidizing agent which oxidizes such impurities to high-boiling point oxidized impurity compounds, separating such high-boiling point oxidized impurity compounds from the hydrofluoric acid, contacting the partially purified hydrofluoric acid with a halogen selected from the class consisting of iodine, bromine and chlorine to form high-boiling point halogen-impurity compounds, and then separating the high-boiling point halogen-impurity compounds from the hydrofluoric acid.

3. A process for removing arsenic, phosphorus and sulfur impurities from hydrofluoric acid which comprises in sequence contacting the hydrofluoric acid with a halogen selected from the class consisting of iodine, bromine and chlorine to form high-boiling point halogen-impurity compounds, separating the high-boiling point halogen-impurity compounds from the hydrofluoric acid, contacting the partially purified hydrofluoric acid with an oxidizing agent which oxidizes the remaining impurities to high-boiling point oxidized impurity compounds, and then separating the high-boiling point oxidized impurity compounds from the hydrofluoric acid.

4. A process for removing arsenic, phosphorus and sulfur impurities from hydrofluoric acid which comprises the steps of contacting the hydrofluoric acid with an oxidizing agent which oxidizes such impurities to high-boiling point oxidized impurity compounds, separating such high-boiling point oxidized impurity compounds from the hydrofluoric acid by means of distillation, contacting the hydrofluoric acid with a halogen selected from the class consisting of iodine, bromine and chlorine to form high-boiling point halogen-impurity compounds, and then separating the high-boiling point halogen-impurity compounds from the hydrofluoric acid by means of distillation.

5. A process for removing impurities, especially arsenic and phosphorus impurities, from hydrofluoric acid which comprises contacting the hydrofluoric acid with an oxidizing agent and a halogen selected from the class consisting of iodine, bromine and chlorine to form high-boiling point oxidized impurity compounds and high-boiling point halogen-impurity compounds, and separating such high-boiling point compounds from the hydrofluoric acid.

6. A process for removing impurities from hydrofluoric acid as claimed in claim 5 wherein the oxidizing agent is potassium permanganate.

7. A process for removing impurities from hydrofluoric acid as claimed in claim 5 wherein the halogen is iodine.

8. A process for removing arsenic, phosphorus and sulfur impurities from hydrofluoric acid as claimed in claim 4 wherein the oxidizing agent is potassium permanganate and the halogen is iodine.

9. A process for removing phosphorus impurities from hydrofluoric acid which comprises contacting the hydrofluoric acid with a halogen selected from the group consisting of iodine, bromine and chlorine to form high-boiling point halogen-impurity compounds, and then separating such high-boiling point halogen-impurity compounds from the hydrofluoric acid.

References Cited in the file of this patent
UNITED STATES PATENTS

| | | |
|---|---|---|
| 2,777,754 | Weinmayer | Jan. 15, 1957 |
| 2,952,334 | Provoost et al. | Sept. 13, 1960 |
| 3,004,829 | Boyle et al. | Oct. 17, 1961 |

OTHER REFERENCES

Lowry's book on "Inorganic Chemistry," 2nd edition (1931), page 345, Macmillan and Co., Ltd., London.

Baker's Specification Catalog, Baker Analyzed Reagents and Other Chemicals, April 1954, page 100, published by J. T. Baker Chemical Co., Phillipsburg, New Jersey.